Sept. 26, 1961 F. A. JOHNSON 3,001,591
RIPPER SHANK WITH WEAR PLATE
Filed Oct. 6, 1958
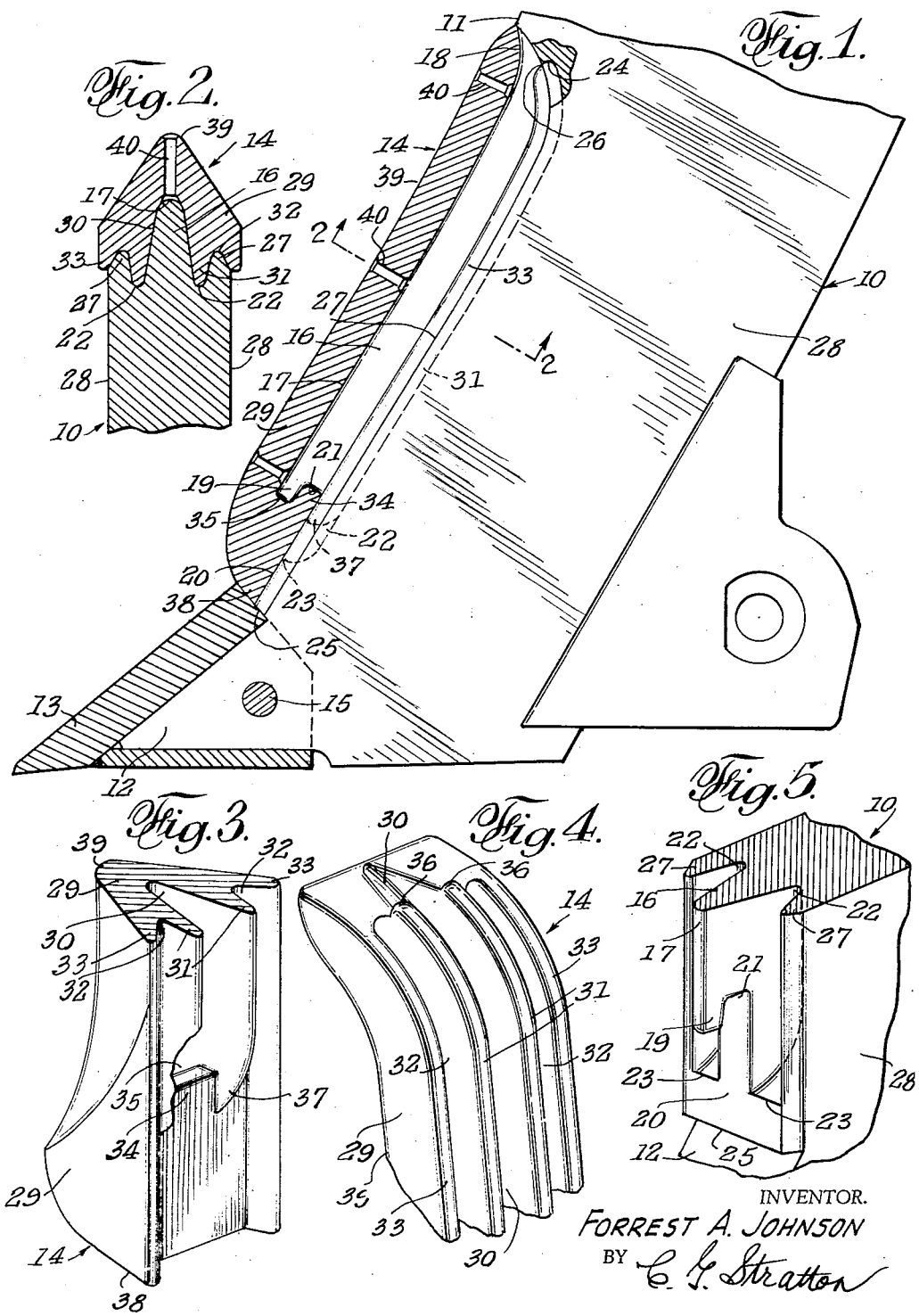
INVENTOR.
FORREST A. JOHNSON
BY C. G. Stratton
ATTORNEY

3,001,591
RIPPER SHANK WITH WEAR PLATE
Forrest A. Johnson, Buena Park, Calif., assignor to Double J. Breaker Co., Bell, Calif., a corporation of California
Filed Oct. 6, 1958, Ser. No. 765,585
7 Claims. (Cl. 172—700)

This invention relates to a ripper shank with a removable wear plate.

The ripper devices of soil-breaking or -turning machines are subject to rapid wear along the leading edge thereof. Replacement of the worn edge, as by welding on a new edge, must be resorted to as often as wear becomes so excessive as to endanger the useful life of the shank. Such replacement by welding is costly, both on account of the cost of the operation and on account of the lay-up time of the agricultural machine of which the ripper is a part. Moreover, repeated welds render the shank too brittle for fractureless soil ripping and the same soon requires replacement in total.

Recognizing the faults in the present manner of replacing or renewing the soil-breaking edge of a ripper shank, an object of this invention is to provide means that obviates said faults and provides a wear plate construction that is readily installed and as readily removed with use of fasteners such as bolts, screws, etc.

Another object of the invention is to provide a wear plate construction of the character referred to that is held in operative position by the upper point, an element normally constituting part of a ripper shank assembly.

A further object of the invention is to provide a construction as above referred to, in which the shank and a replaceable wear plate are so interengaged as to obviate relative lateral displacement during use of the ripper.

A still further object of the invention is to provide a ripper shank with a replaceable wear plate in which the latter is held in operative position by seepage of fine soil particles between the shank and plate, the latter being provided with means aiding such seepage of soil particles.

The invention also has for its objects to provide such means that are positive in operation, convenient in use, easily installed in a working position and easily disconnected therefrom economical of manufacture, relatively simple, and of general superiority and serviceability.

The invention also comprises novel details of construction and novel combinations and arrangements of parts, which will more fully appear in the course of the following description. However, the drawing merely shows and the following description merely describes, one embodiment of the present invention, which is given by way of illustration or example only.

In the drawing, like reference characters designate similar parts in the several views.

FIG. 1 is a side elevational view of the lower portion of a ripper shank, a wear plate according to the present invention being shown in operative position on said shank.

FIG. 2 is an enlarged fragmentary cross-sectional view as taken on the line 2—2 of FIG. 1.

FIG. 3 is a similarly enlarged perspective view of the lower portion of the wear plate as seen from the side thereof that is engaged with the ripper shank.

FIG. 4 is a similar perspective view of the upper portion of the wear plate.

FIG. 5 is a fragmentary perspective view of the edge portion of the ripper shank that is engaged with the lower portion of the wear plate.

The ripper shank 10 that is illustrated is usually incorporated as part of an agricultural machine that is either driven or towed in a direction toward the left in FIG. 1. In addition to a soil-ripping edge 11 that is sloped rearwardly upwardly, the shank is ordinarily formed with a lower forwardly directed projection 12 in which is removably provided a hardened point 13. While, in some instances, the point 13 is formed as an integral part of the shank 10, the present disclosure shows said point as a replaceable element and it is here used as means to lock a replaceable wear plate 14 in place on the shank. How the point 13 is secured to the projection 12 is not important to the present invention, since this may be done in several ways, the bolt 15 merely being an example of point-securing means.

As best shown in FIGS. 2 and 5, the ripper edge 11 of the shank 10 is formed to have a longitudinal centrally disposed rib 16 that preferably has a tapered cross-sectional form. In practice, the forward edge 17 of said rib is set inwardly from the normal line of edge 11. At its upper end, said rib edge 17 is curved at 18 to join the lower point or end of edge 11 and, at the lower end of the rib, the same terminates in a down-reaching tongue or projection 19 that is spaced forwardly from a base surface 20 (FIGS. 1 and 5) on the shank 10 and from which the rib 16 forwardly projects. A recess or undercut 21 between said surface and the tongue 19 enables the latter to serve as a hook, as will later be seen.

Flanking said rib 16 and set in or depressed below the surface 20, there are provided two transversely tapered longitudinal grooves 22 which extend from points 23 below the lower end of rib 16 and end recesses 24 adjacent to where the rib 16 meets the shank edge 11. The surface 20 terminates, at its lower end, at a transverse shoulder 25, the projection 12 of the shank extending angularly downward and forward from said shoulder. Thus, the grooves 22 extend upward from points between said shoulder 25 and the lower end of tongue 19.

It will be noted, from FIG. 1, that the upper end recesses 24 are undercut, i.e., said recesses have outer edges 26 that are lower than recesses themselves and which, therefore, comprise confining pockets.

Said grooves 22 define outer ribs 27 between themselves and the side faces 28 of the shank 10. Hence, as shown, the forward edge of the shank, between the lower end of shank edge 11 and the shoulder 25, is provided with a central rib 16 that terminates short of said shoulder and two flanking lower ribs 27 that have their ends spaced, at the top, from edge 11 and, at the bottom, from shoulder 25. It will be noted that the rib 16 tapers, at its upper end, because the surface 20 is curved to meet the shank edge 11.

The wear plate 14 fits against the above-described forward edge of shank 10 between the shoulder 25 and the lower end of edge 11, said plate comprising a hardened bar either as thick as, or, as shown, preferably thicker than the shank 10. Said bar, on the edge thereof engaged with the shank, is formed with ribs and grooves that are complementary to and interfit with those of the shank. Thus, said plate 14 is formed to have a central longitudinal groove 30 that interfits with rib 16, flanking ribs 31 that interfit with grooves 22, and shallower grooves 32 that interfit with ribs 27 and are defined between ribs 31 and laterally outward ribs 33. It will be clear that the ribs 27 of the shank, by confining the ribs 31 of the wear bar, prevent not only lateral displacement, relatively, of the shank and wear plate, but also obviate distortion or spreading of the latter when subjected to soil-ripping forces.

The groove 30 conforms in longitudinal shape and extent to the rib 16 of the shank. Accordingly, the same, as seen in FIG. 1, has a ledge 34 that conforms to and fits recess 21, and an undercut or recess 35 that receives tongue 19.

The ribs 31, at their upper ends 36, are formed to so fit recesses 24 as to be caught behind edges 26, this interfit firmly holding the upper end of the plate 14 in place against the shank. The lower ends 37 of the ribs 31 terminate above the points 23 of groove 22, as can be seen in FIG. 1. Thus, with the point 13 removed, it is a simple matter to place the wear plate 14 with its longitudinal grooves and ribs interfitted with the complementary ribs and grooves of the shank and with the ledge 34 of the plate below the tongue 19 on the rib 16, and then to upwardly slide said plate until the rib ends 36 enter the undercut pockets 24. In such position, the tongue 19 will reside in recess 35 and cooperate with ledge 34 to retain the lower end of the wear plate against outward displacement from the shank.

When the wear plate is positioned as above, the lower end 38 thereof will substantially coincide with the shoulder 25 (see FIG. 1). Thus, when point 13 is applied to the projection 12, the same will effectively lock the wear plate in place.

It will be realized that the undercut means at the lower end of the structure may be used at the upper end also, except, as suggested by the pockets 24 and the projections 36, the tongue and ledge interconnection may be provided on the ribs 31 and in the grooves 22. The interlock will be similar to that described in connection with portions 19 and 34.

Because of the structural nature of the present device, the parts cannot be expected to interfit with such precision as would surely obviate some looseness or play. At least, it would be inordinately expensive to machine with such accuracy. In order to eliminate the need for such accurate machining, the wear plate or bar 14, between its forward ripper edge 39 and the bottom of longitudinal groove 30, is provided with several small holes 40, as in FIGS. 1 and 2, the same affording a means for fine or powdered particles of soil to enter into the spaces, if any, between the grooves and ribs of the device and fill in and compact in such spaces, as the device is being used in soil-ripping operations. As a consequence, after short use, the wear plate will become "frozen" onto the shank and, in effect, an integral part thereof. Nevertheless, when the plate requires replacement, its removal from the blade becomes merely a matter of tapping it loose, after the tip has been removed. Since no bolts hold the plate 14 in place, the difficult operation of loosing the same is obviated by the present construction.

While the foregoing specification illustrates and describes what I now contemplate to be the best mode of carrying out my invention, the construction is, of course, subject to modification without departing from the spirit and scope of my invention. Therefore, I do not desire to restrict the invention to the particular form of construction illustrated and described, but desire to cover all modifications that may fall within the scope of the appended claims.

Having thus described my invention, what I claim and desire to secure by Letters Patent is:

1. A ripper structure comprising, in combination with a ripper blade provided with a removable point and having a forwardly directed edge extending above the point, a wear plate mounted on said blade, longitudinal interengaging ribs and grooves along said blade edge and a side of the wear plate contiguous to said edge, downwardly open recesses at both ends of the blade edge, and upwardly directed projections on the wear plate engaged in the recesses, said point being engaged with the lower end of the wear plate to retain engagement of said projections in the recesses and the wear plate immovably on the ripper blade.

2. A ripper structure according to claim 1 in which the wear plate is provided with a tapered soil-ripping edge and the plate is provided with a plurality of soil-passing holes extending from said edge to the area of interengagement of said ribs and grooves of the plate and blade edge.

3. A ripper structure comprising, in combination with a ripper blade provided with a removable point and having a forwardly directed edge extending above the point, a wear plate mounted on said blade, longitudinal interengaging ribs and grooves along said blade edge and a side of the wear plate contiguous to said edge, the same comprising three ribs and two grooves defined therebetween on the mentioned edge of the blade with complementary grooves in the plate for said ribs of the blade edge, downwardly open recesses at both ends of the blade edge, and upwardly directed projections on the wear plate engaged in the recesses, said point being engaged with the lower end of the wear plate to retain engagement of said projections in the recesses and the wear plate immovably on the ripper blade.

4. A ripper structure comprising a central longitudinal rib along the soil-ripping edge of said structure, two lower flanking ribs along said edge and spaced from the central rib by longitudinal grooves, a wear plate in covering relation to said edge, and having a central longitudinal groove in which the central rib of said edge is fitted, and complementary ribs and grooves in said plate flanking the central groove and engaged with the lower flanking ribs and lower longitudinal groove of the edge to retain the wear plate against spreading laterally on each side of the central groove thereof.

5. A ripper structure according to claim 4 in which all of the ribs and grooves are cross-sectionally tapered, the wear plate being provided with holes entering on the groove into which the larger rib of the ripper blade fits, said holes constituting soil-particle-passing means to conduct soil particles into the area of interfit of said ribs and grooves.

6. A ripper structure comprising, in combination, a ripper blade having a forwardly directed edge, a wear plate disposed on said edge to cover the same, complementary and interengaged undercut hook means on both the ends of the wear plate and on the opposite ends of said blade edge to hold the wear plate against displacement from the blade edge in a direction normal to the longitudinal extent of said blade edge and also against longitudinal displacement in a direction away from the lower end of the ripper blade, said inter-engaged hook means being directed to allow free separation movement of the wear plate from the upper blade in a direction toward the lower end of the ripper blade and a removable ripper point carried by the blade below and in contact with the lower end of the wear plate to hold said wear plate against said longitudinal displacement in a direction toward the lower end of the ripper blade.

7. A ripper structure comprising, in combination, a ripper blade including a portion having a forwardly directed edge, a wear plate disposed on said edge to cover the same, complementary and interengaged means on both the ends of the wear plate and on the opposite ends of said blade edge to hold the wear plate against displacement from the blade edge in a direction normal to the longitudinal extent of said blade edge and also against longitudinal displacement in a direction away from the lower end of the ripper blade, the ripper blade having another portion below the lower end of said forwardly directed edge of said blade, and a ripper tooth removably carried by said another portion and in contact with the lower end of the wear plate to hold said wear plate against longitudinal displacement in a direction toward the lower end of the ripper blade.

References Cited in the file of this patent

UNITED STATES PATENTS

| | | |
|---|---|---|
| 247,148 | Anderson | Sept. 20, 1881 |
| 296,983 | Luse | Apr. 15, 1884 |
| 534,790 | Gray | Feb. 26, 1895 |
| 639,904 | Neff et al. | Dec. 26, 1899 |
| 916,868 | Horinek | Mar. 30, 1909 |
| 1,287,291 | Gordon | Dec. 10, 1918 |
| 2,876,853 | Christofferson | Mar. 10, 1959 |